(12) United States Patent
Riley et al.

(10) Patent No.: US 7,350,534 B2
(45) Date of Patent: Apr. 1, 2008

(54) HOLLOW BALL VALVE ASSEMBLY

(75) Inventors: Andrew Dale Riley, Eufaula, OK (US); Mark A. Staggs, McAlester, OK (US)

(73) Assignee: National-Oilwell Varco, L.P., Houston, TX (US)

( * ) Notice: Subject to any disclaimer, the term of this patent is extended or adjusted under 35 U.S.C. 154(b) by 387 days.

(21) Appl. No.: 10/906,314

(22) Filed: Feb. 14, 2005

(65) Prior Publication Data

US 2006/0180209 A1    Aug. 17, 2006

(51) Int. Cl.
*F16K 15/04* (2006.01)

(52) U.S. Cl. .............. 137/15.22; 137/315.33; 137/539; 137/533.11

(58) Field of Classification Search ......... 137/533.11, 137/533.13, 533.15, 539, 539.5, 15.22, 315.33, 137/433
See application file for complete search history.

(56) References Cited

U.S. PATENT DOCUMENTS

| | | | |
|---|---|---|---|
| 3,602,176 A * | 8/1971 | Helbig | 114/52 |
| 3,742,975 A | 7/1973 | Kazama et al. | |
| 3,776,255 A * | 12/1973 | Fujiwara | 137/433 |
| 4,535,800 A * | 8/1985 | Leech | 137/433 |
| 5,061,159 A * | 10/1991 | Pryor | 417/569 |
| 6,155,806 A * | 12/2000 | Andel | 417/523 |
| 2005/0121084 A1* | 6/2005 | Andersson | 137/533.11 |

FOREIGN PATENT DOCUMENTS

| | | |
|---|---|---|
| FR | 2292577 | 6/1976 |
| JP | 06185643 | 7/1994 |

OTHER PUBLICATIONS

EPO Search Report for Appln. No. 06250593.8 dated Jun. 2, 2006; (pp. 4).

* cited by examiner

*Primary Examiner*—John Rivell
(74) *Attorney, Agent, or Firm*—Conley Rose, P.C.

(57) ABSTRACT

Apparatus and methods for constructing a valve comprising a sealing member and a hollow ball operable to sealingly engage the sealing member. A guide housing disposed about said hollow ball and does not constrain rotation of said hollow ball. A spring is disposed between the hollow ball and the guide housing so as to bias the hollow ball into sealing engagement with the sealing member. The hollow ball is constructed from two unequal sized portions and may comprise a hollow, spherical body having an aperture and a plug sized so as to closely fit within the aperture.

17 Claims, 3 Drawing Sheets

HOLLOW BALL VALVE ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to methods and apparatus for controlling flow in a pump. More particularly, the present invention relates to suction and discharge valves for reciprocating pumps used to pump abrasive fluids.

Suction and discharge valves are used in reciprocating pumps to control the flow of fluid into and out of the cylinders in which the fluid is pressurized. Reciprocating pumps are used by in various operations to pressurize an often abrasive slurry mixture of solids and liquids. For example, reciprocating pumps are used in drilling operations to pressurize a slurry mixture of solids and liquids known as drilling mud to the bottom of a hole drilled into the earth. The pressurized mud is used to lubricate and cool a downhole drill bit as well as to carry loosened sediment and rock cuttings back to the surface. At the surface, the cuttings and sediment are removed from the returning drilling mud for examination and the filtered drilling mud is able to be reused. In many cases, highly abrasive particles are present in the fluids that are being pumped through the system.

Because of these highly abrasive components, valves and seals of reciprocating pumps must be designed to resist harsh abrasion, while maintaining positive sealing action and withstanding high operating pressures. Due to the abrasive and corrosive nature of most drilling fluids, these valves have a finite service life and must be replaced when the leakage rate increases to a point that the pump will not maintain satisfactory pressure for the drilling conditions. These valves and seats normally fail due to a deterioration of the elastomer sealing element of the valve, erosion cause by fluid cutting of the valve & seat metal contact surfaces or a combination of these two. Because, the maintenance of these valves is a time consuming and expensive process, valves having an increased service life are desirable Thus, there remains a need to develop methods and apparatus for suction and discharge valves, which overcome some of the foregoing difficulties while providing more advantageous overall results.

SUMMARY OF THE PREFERRED EMBODIMENTS

The embodiments of the present invention are directed toward apparatus and methods for constructing a valve comprising a sealing member and a hollow ball operable to sealingly engage the sealing member. A guide housing disposed about said hollow ball and does not constrain rotation of said hollow ball. A spring is disposed between the hollow ball and the guide housing so as to bias the hollow ball into sealing engagement with the sealing member. The hollow ball is constructed from two unequal sized portions and may comprise a hollow, spherical body having an aperture and a plug sized so as to closely fit within the aperture.

In certain embodiments, a pump assembly comprises a fluid-end assembly having a conduit in fluid communication with a reciprocating piston. A fluid supply and a fluid outlet are in fluid communication with the conduit. The pump assembly also comprises a suction valve having a hollow ball biased into sealing engagement with a sealing member so as to prevent fluid communication between said fluid supply and the conduit. A discharge valve comprises a hollow ball biased into sealing engagement with a sealing member so as to prevent fluid communication between said fluid discharge and the conduit. The hollow balls of the discharge valve and the suction valve are each constructed from two unequal sized portions.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
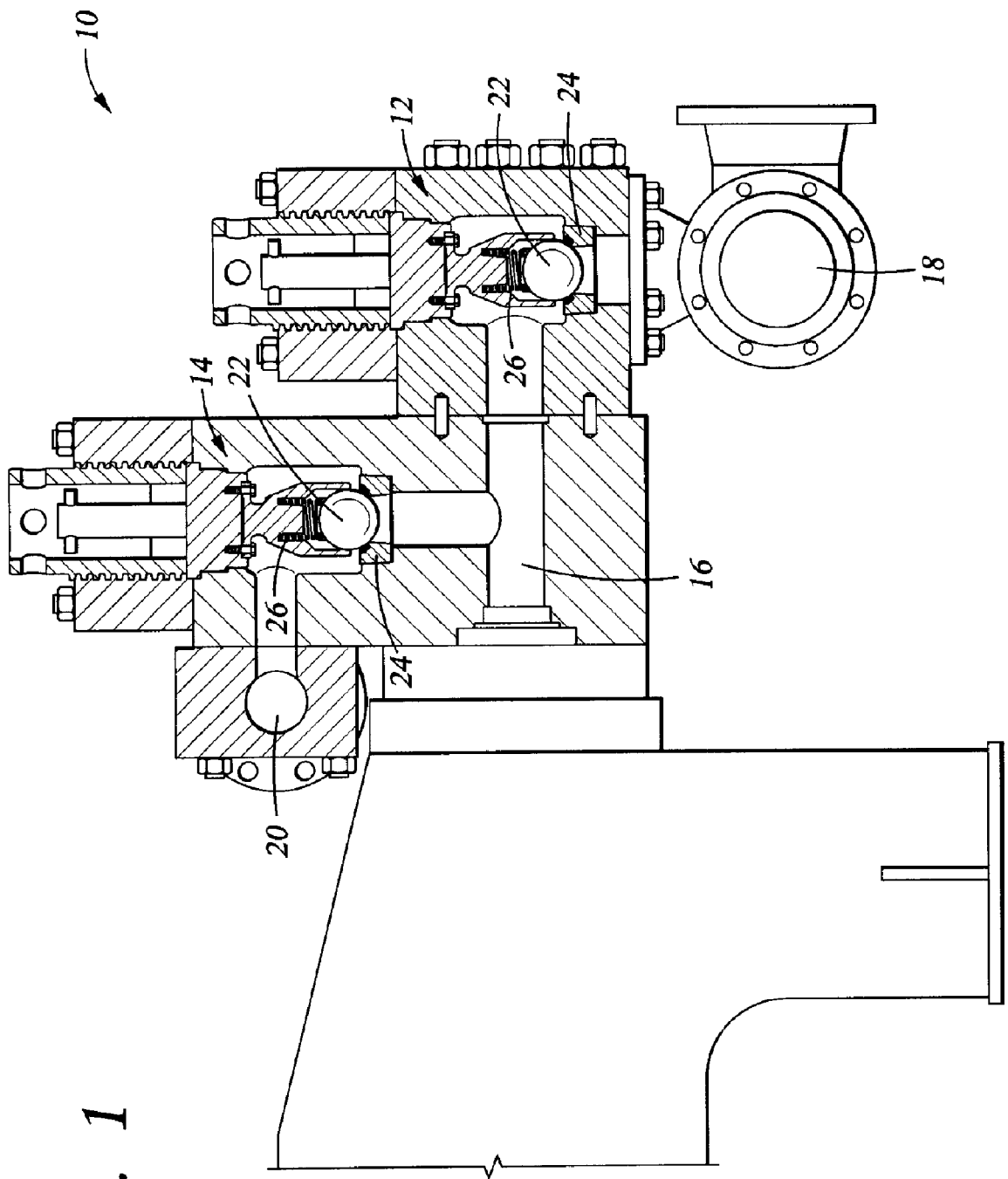
FIG. 1 is a partial sectional view showing a pump assembly constructed in accordance with embodiments of the invention.

Referring now to FIG. 1, pump fluid-end assembly 10 comprises suction valve 12 and discharge valve 14 that are hydraulically connected to a piston and cylinder (not shown) via conduit 16. Suction valve 12 is connected to fluid supply 18. Discharge valve 14 is connected to fluid outlet 20. Each valve 12, 14 comprises a closure member 22 that is urged into sealing engagement with a sealing member 24 by a biasing member 26. Valves 12 and 14 are opened by pressure acting on closure member 22 so as to compress biasing member 26 and move the closure member out of engagement with sealing member 24. Thus, each valve 12 and 14 only allows flow in one direction through the valve and are arranged such that suction valve 12 allows fluid to flow into conduit 16 and discharge valve 14 allows fluid to flow out of conduit 16.

As piston moves and expands the volume within the cylinder, discharge valve 14 closes and suction valve 12 opens so that fluid flows from fluid supply 18 into conduit 16. The piston then reverses direction, decreasing the volume within the cylinder and thus increasing the pressure within conduit 16 so that suction valve 12 closes and discharge valve 14 opens so as to allow fluid to flow into fluid outlet 20. The cycle repeats, often at a high cyclic rate, as fluid is being pumped.

Figure 2:
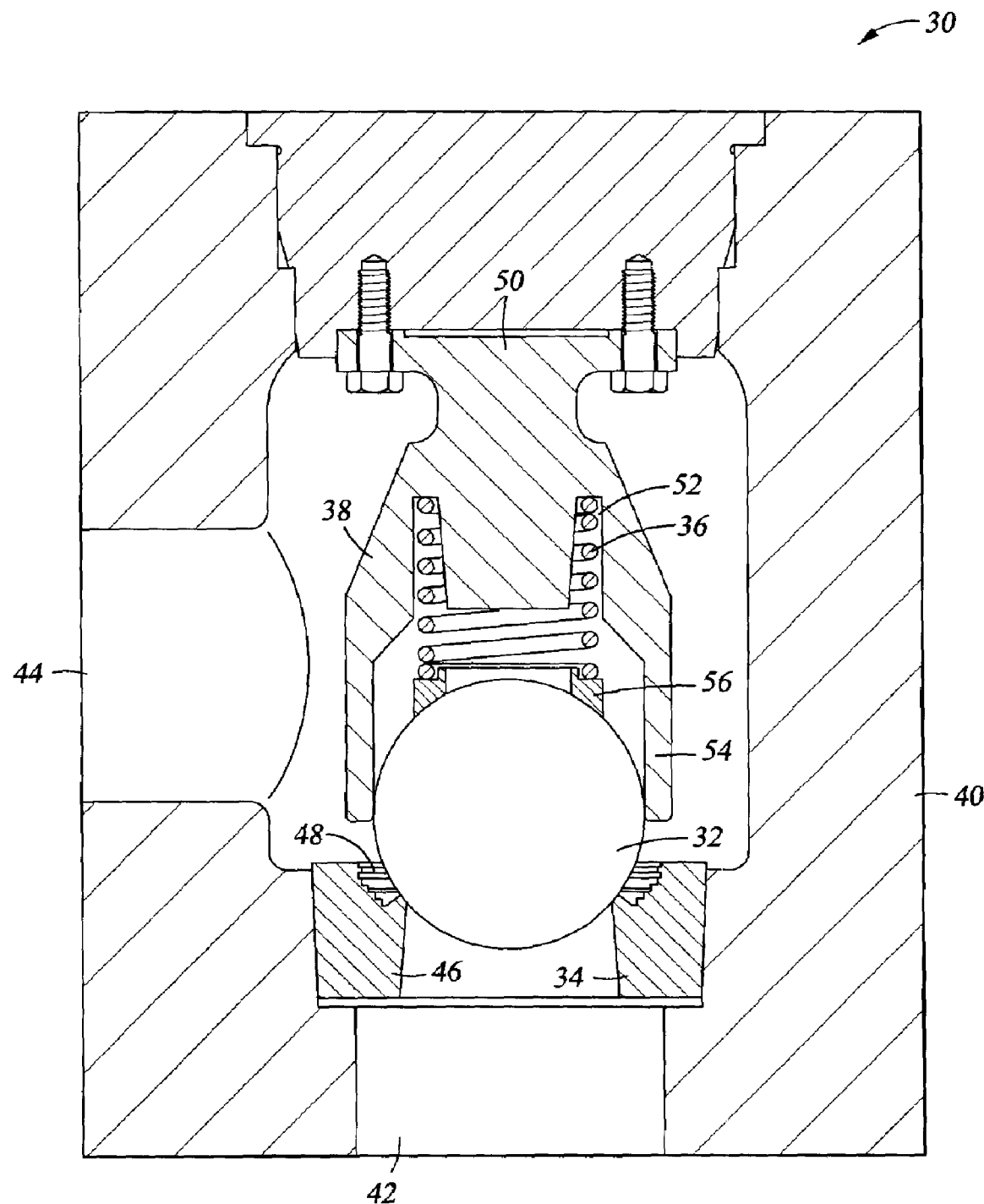
FIG. 2 is a cross-sectional elevation view of a valve assembly constructed in accordance with embodiments of the invention.

Referring now to FIG. 2, ball valve assembly 30 comprises ball 32, sealing member 34, spring 36, and guide housing 38. Valve assembly 30 is disposed within flow body 40 comprising inlet 42 and outlet 44. Sealing member 34 further comprises seat 46 and seal 48 that are disposed about inlet 42 of body 40. Guide housing 38 comprises flange 50 that attaches to body 40, upper spring retainer 52, and ball cage 54. Spring member 36 interfaces with upper spring retainer 52 and may also comprise lower spring retainer 56 that provides an interface between biasing member 36 and sealing member 34.

Spring 36 may be a coil spring having a stiffness selected to provide sufficient sealing at a desired pressure. For example, the higher the stiffness of the selected spring the more pressure the valve will hold before opening. Spring 36 biases ball 34 against seal 48, which is constructed of a resilient material that is bonded to seat 46, so as to compress the resilient seal material and create a seal between seal 48 and ball 34. As long as the force generated by spring 36 exceeds the force generated by fluid pressure in inlet 42 against ball 34, the ball will remain engaged with seal 48.

Once the pressure within inlet 42 reaches a certain level, the force generated by the pressure acting on ball 32 will compress spring 36 and move the ball out of engagement with seal 48 allowing flow from inlet 42 to outlet 44. The flow of fluids will continue as long a pressure differential exists between inlet 42 and outlet 44. Once the pressure differential decreases, spring 36 will move ball 32 back into sealing engagement with seal 48. When used in a pump application, as described in reference to FIG. 1, valve assembly 30 cycles, i.e. opens and closes, with every stroke of a piston, as often as several times a second.

Guide housing 38 is arranged so as to not constrain rotation of ball 32. The fluid flow around ball 32 will cause a slight rotation during the opening & closing cycle of valve 30, allowing for a slightly different portion of the ball to contact seal 48 on every opening and closing cycle. Ball 32 can seal equally effectively on its entire surface and, because it is allowed to rotate, it is not limited to hitting the same surfaces every cycle. This results in a significant reduction in the wear rate on the ball when compared to the current valve configurations. The end result of the reduced wear and erosion rate is much longer valve life when operating under like conditions.

Because valve assembly 30 is expected to be able to cycle rapidly, the mass of ball 32 limits the size of valve assembly. Once the mass of a ball becomes too high, the inertia of the ball prohibits rapid cycling of the valve. Therefore, in order to reduce the mass of a ball of a given size, a hollow ball may be used. In certain sizes, a ball valve utilizing a hollow ball may be lighter than a comparable sized plug-type valve. Although the use of a hollow ball may reduce the mass of the ball, other problems become apparent, especially when the valve is used with an abrasive fluid at high pressures and flow rates.

Hollow balls are often formed by welding together two semi-spherical halves to form a ball. Welding together the two halves results in a circumferential seam and a corresponding heat affected zone in the each half. The material within the weld and the heat affected zones will have different material properties from the other material in the halves and will therefore tend to wear at a different rate than the remainder of the ball.

As the materials wear at different rates, a large portion of the ball, such as the weld and/or heat affected zone, may not provide a surface suitable to sealing and the sealing reliability of the valve decreases. This decrease in reliability is especially evident in high flow applications where the fluid tends to rotate the ball such that the portion of the ball that contacts the seal is constantly changing. Because the ball is constantly rotating the chance that a portion of the welded or heat affected zone may be in contact with the seal is increased.

Figure 3:
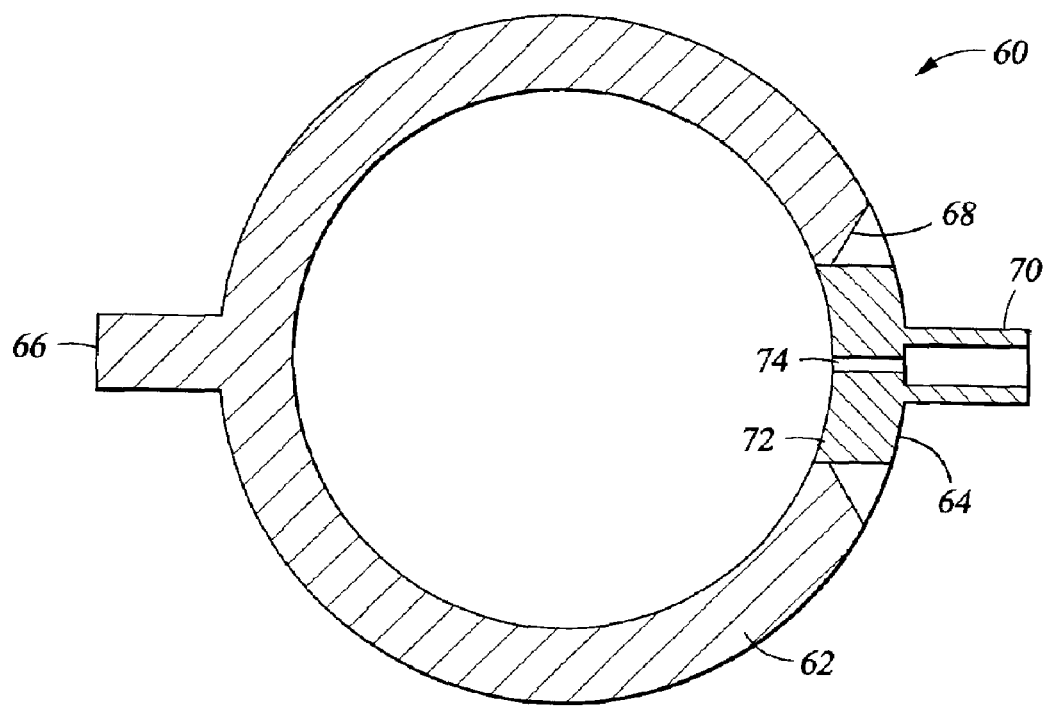
FIGS. 3 and 4 are cross-sectional views of a hollow ball constructed in accordance with embodiments of the invention.
Figure 4:
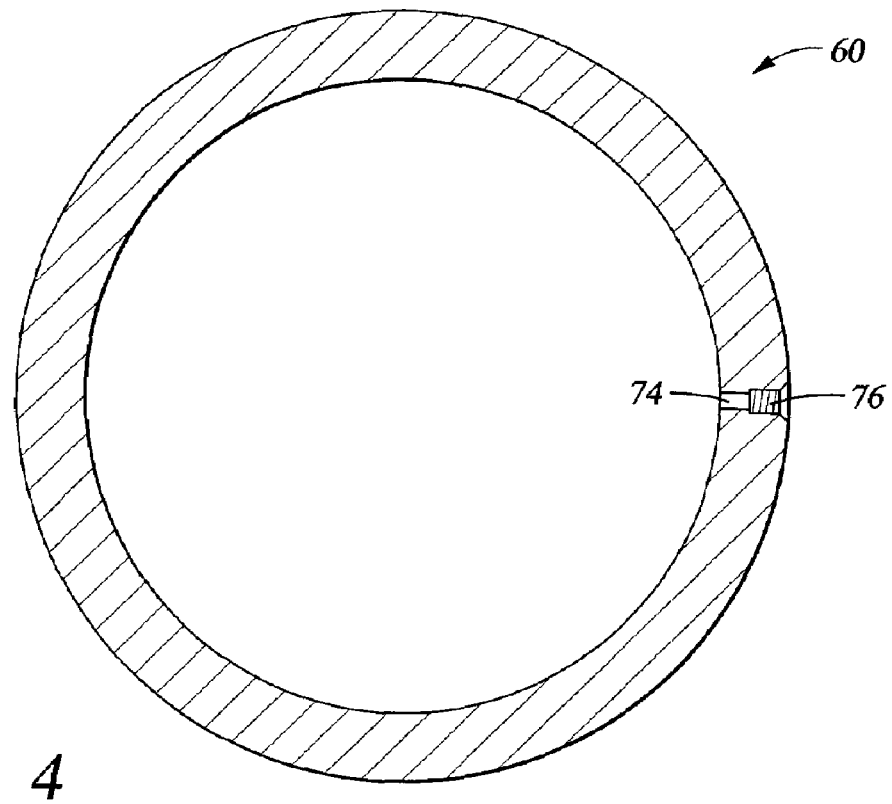

One way to increase the reliability of the valve is to decrease the welded area and corresponding heat affected zone. This can be accomplished by forming the hollow ball from two unequal sized portions, such as is shown in FIGS. 3 and 4. Hollow ball 60 is constructed from a cast body 62 and a plug 64. Cast body 62 is formed as a hollow, spherical piece having a post 66 and an aperture 68. Plug 64 comprises a post 70 protruding from a spherical section 72 sized so as to closely fit within aperture 68. Hole 74 provides fluid communication across plug 64.

Plug 64 is welded into body 62 to form a complete spherical ball 60. Ball 60 may also be heat treated to provide desirable material characteristics. Once welding and heat treating are complete, the outside surface of ball 60 is machined to smooth the surface and remove posts 66 and 70. Hole 74 provides a vent from the inside of ball 60 during the welding and heat treating processes. Once welding and machining are complete, dowel 76 is inserted into hole 74 and welded in place to seal the hole.

Ball 60 thus provides a hollow ball with a minimized welded area and heat affected zone. For example, a 5" diameter ball may be constructed having a ½" wall thickness in order to provide a ball with a mass that enables fast actuation of the valve. The plug for the 5" diameter ball may be a circular plug having a diameter of approximately 1.5". A 5" diameter ball constructed with a 1.5" plug will have a linear weld length of less than 5" while a 5" diameter ball constructed from two semi-spheres will have a weld length greater than 15". Since the welded area is reduced the frequency that the weld comes in contact with the seat is also reduced, thus providing an extended service life.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the methods and apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A valve comprising:

a sealing member;

a hollow ball having an outer circumference and operable to sealingly engage said sealing member, wherein said hollow ball is constructed from unequal sized portions comprising:

a hollow, spherical body having an aperture therethrough;

a plug sized so as to closely fit within the aperture, the plug having a hole therethrough; and a dowel inserted into the hole; and a guide housing disposed about said hollow ball, wherein said guide housing does not constrain rotation of said hollow ball; and a spring disposed between said hollow ball and said guide housing, wherein said spring is operable to bias said hollow ball into sealing engagement with said sealing member.

2. The valve of claim 1 wherein the hollow, spherical body and the plug are welded together.

3. The valve of claim 1 further comprising a body having an inlet and an outlet, wherein fluid flow between the inlet and outlet is prevented when said hollow ball is engaged with said sealing member.

4. The valve of claim 1 wherein the hollow, spherical body and the plug have spherical outer surfaces that are non-threadingly engaged along an interface.

5. The valve of claim 4 wherein said ball has an outer diameter that is at least three times larger than said interface length.

6. The valve of claim 4 wherein said interface length is greater than one inch and less than two inches.

7. A pump assembly comprising:
   a fluid-end assembly having a conduit in fluid communication with a reciprocating piston;
   a fluid supply in fluid communication with the conduit;
   a fluid outlet in fluid communication with the conduit;
   a suction valve comprising a hollow ball having a circumference and biased into sealing engagement with a sealing member so as to prevent fluid communication between said fluid supply and the conduit; and
   a discharge valve comprising a hollow ball having a circumference and biased into sealing engagement with a sealing member so as to prevent fluid communication between said fluid discharge and the conduit;
   wherein the hollow ball of said discharge valve and the hollow ball of said suction valve are each constructed from two unequal sized spherical portions having spherical outer surfaces that are nonthreadingly engaged.

8. The pump assembly of claim 7 wherein the two unequal sized portions of the hollow balls are welded together.

9. The pump assembly of claim 7 wherein the hollow balls comprise:
   a hollow, spherical body having an aperture therethrough; and
   a plug sized so as to closely fit within the aperture.

10. The pump assembly of claim 9, wherein at least one of the hollow balls has an outer diameter substantially equal to 5.0 inches and an interface length substantially equal to 1.5 inches.

11. The pump assembly of claim 7, wherein at least one of the spherical portions further comprises a plugged aperture.

12. A method for constructing a valve comprising:
   joining two unequal sized spherical portions to form a hollow ball forming a post on one spherical portion;
   disposing the hollow ball within a guide housing; and
   disposing a spring between the hollow ball and the guide housing so as to urge the hollow ball into sealing engagement with a sealing member.

13. The method of claim 12 further comprising disposing the valve assembly in a body having an inlet and an outlet, wherein fluid flow between the inlet and outlet is prevented when the hollow ball is in sealing engagement with the sealing member.

14. The method of claim 13 wherein the body is a fluid end assembly of a reciprocating pump.

15. The method of claim 12 wherein joining two unequal sized spherical portions to form a hollow ball further comprises:
   forming a hollow, spherical body having an aperture therethrough;
   forming a plug sized so as to closely fit within the aperture; and fixing the plug within the aperture.

16. The method of claim 12, further comprising:
   removing the post.

17. The method of claim 16, wherein said removing is performed by machining.

* * * * *